(12) United States Patent
Suzuyama et al.

(10) Patent No.: US 8,677,015 B2
(45) Date of Patent: Mar. 18, 2014

(54) LINK TRACE FRAME TRANSFER PROGRAM RECORDING MEDIUM, SWITCHING HUB, AND LINK TRACE FRAME TRANSFER METHOD

(75) Inventors: Shigeru Suzuyama, Fukuoka (JP);
Hiroshi Kinoshita, Fukuoka (JP);
Shingo Suzumori, Fukuoka (JP);
Takahiro Suetsugu, Fukuoka (JP);
Daisuke Nagai, Fukuoka (JP); Kunihiko Hamamoto, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1157 days.

(21) Appl. No.: 11/963,390

(22) Filed: Dec. 21, 2007

(65) Prior Publication Data
US 2008/0168120 A1 Jul. 10, 2008

(30) Foreign Application Priority Data
Jan. 5, 2007 (JP) ................................. 2007-000785

(51) Int. Cl.
*G06F 15/173* (2006.01)
(52) U.S. Cl.
USPC ............................ 709/238; 709/239; 709/242
(58) Field of Classification Search
USPC ......................................... 709/238, 239, 242
See application file for complete search history.

(56) References Cited

U.S. PATENT DOCUMENTS

| | | | |
|---|---|---|---|
| 6,202,114 B1 * | 3/2001 | Dutt et al. ..................... 710/311 |
| 6,816,490 B1 * | 11/2004 | Chung .......................... 370/392 |
| 2003/0031190 A1 * | 2/2003 | Ohnishi ........................ 370/401 |
| 2003/0046339 A1 * | 3/2003 | Ip ................................. 709/203 |
| 2004/0213272 A1 * | 10/2004 | Nishi et al. ................... 370/401 |
| 2006/0203735 A1 * | 9/2006 | Takatori et al. .............. 370/242 |
| 2008/0165705 A1 * | 7/2008 | Umayabashi et al. ........ 370/256 |
| 2008/0279196 A1 * | 11/2008 | Friskney et al. ......... 370/395.53 |

FOREIGN PATENT DOCUMENTS

JP 2002-252625 9/2002

* cited by examiner

*Primary Examiner* — Ashok Patel
*Assistant Examiner* — Lawrence Cosby
(74) *Attorney, Agent, or Firm* — Staas & Halsey LLP

(57) ABSTRACT

The disclosed apparatus includes a MAC learning table storing a MAC address and port identification information that uniquely identifies a port for transferring a frame to which the MAC address is assigned. The apparatus includes updating the MAC learning table, reading a MAC address of a link trace frame, transferring the link trace frame via a port determined based on the MAC learning table, storing a correspondence relationship of a predetermined MAC address and port identification information, saving a correspondence relationship set as an object to be deleted at a time of updating the MAC learning table, transferring the link trace frame, if there is no correspondence relationship relevant to the MAC address of the link trace frame in the MAC learning table, and sending a response frame to a switching hub which is an originator of the link trace frame with transfer of the link trace frame.

12 Claims, 18 Drawing Sheets

FIG. 4

FIRST MAC LEARNING TABLE STORAGE UNIT

| PORT IDENTIFICATION INFORMATION | MAC ADDRESS |
|---|---|
| P1 | 1 |
| P1 | 2 |
| P2 | 4 |
| P2 | 5 |
| ⋮ | ⋮ |

FIG. 5

SECOND MAC LEARNING TABLE STORAGE UNIT

| PORT IDENTIFICATION INFORMATION | MAC ADDRESS |
|---|---|
| P2 | 4 |
| P2 | 5 |

LINK TRACE FRAME TRANSFER PROGRAM RECORDING MEDIUM, SWITCHING HUB, AND LINK TRACE FRAME TRANSFER METHOD

CROSS-REFERENCE TO RELATED APPLICATIONS

This application is related to and claims the benefit of priority from Japanese patent application no. 2007-785, filed on Jan. 5, 2007, the entire contents of which are incorporated herein by reference.

BACKGROUND

Field

The present invention relates to a link trace frame transfer program, a link trace frame transfer apparatus, and a link trace frame transfer method.

SUMMARY

The disclosed apparatus comprises a MAC learning table storing a correspondence relationship of a MAC address and port identification information, the port identification information identifying a port for transferring a frame to which the MAC address is assigned, an updating unit updating the MAC learning table, a readout unit reading a MAC address upon receipt of a link trace frame, and a first transfer unit transferring the link trace frame via a port determined by the correspondence relationship in the MAC learning table.

The disclosed apparatus includes a storage unit storing a correspondence relationship of a predetermined MAC address and port identification information, a saving unit saving a correspondence relationship set as an object to be deleted in the storage unit at a time of updating the MAC learning table, a second transfer unit which, if there is no correspondence relationship relevant to the MAC address assigned to the received link trace frame in the MAC learning table, transfers the link trace frame via a port determined by a correspondence relationship saved in the storage unit by the saving unit. A responding unit may be provided to the apparatus which sends back a response frame to a switching hub which is an originator of the link trace frame simultaneously with transfer of the link trace frame by the first and second transfer units.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which;

FIG. 4 is a chart illustrating an example of information stored by a first MAC learning table storage unit;

FIG. 5 is a chart illustrating an example of information stored by a second MAC learning table storage unit;

DETAILED DESCRIPTION OF THE PREFERRED EMBODIMENTS

Figure 1:
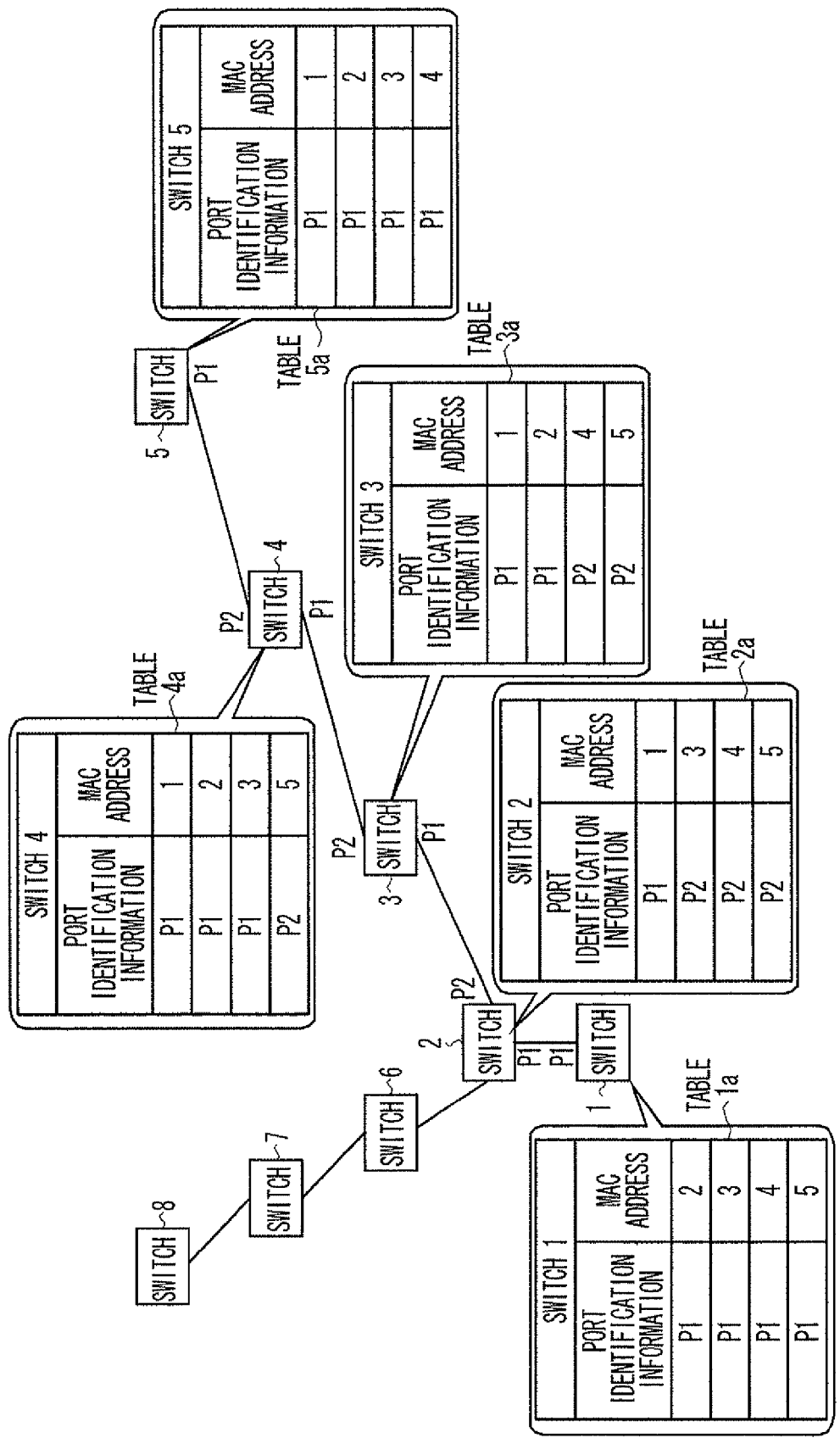
FIG. 1 is a chart illustrating a link trace function of a switching hub.

Reference will now be made in detail to the embodiments, examples of which are illustrated in the accompanying drawings, wherein like reference numerals refer to the like elements throughout. The embodiments are described below to explain the present invention by referring to the figures.

There is a defined standard called Ethernet (registered trademark) OAM (Operation, Administration, and Management) used for maintenance and management of an Ethernet (registered trademark) network. One of the functions of Ethernet (registered trademark) OAM used for network fault management is a LT (Link Trace).

A switching hub "A" sends a link trace frame with a target set to a switching hub "B" which is a point of arrival to determine if there is a fault on a path from itself to the destination switching hub. Intermediate switching hubs at points of passage between the switching hubs "A" and "B" receive the link trace frame. Each intermediate switching hub transfers the link trace frame to a switching hub at a next point of passage upon receipt of the frame. The intermediate switching hub sends back a response frame to the switching hub "A" simultaneously with the transfer. If the switching hub "A" receives response frames from the switching hubs, it determines that the path is normal. On the other hand, if the switching hub "A" receives no response frame, it determines that there is a fault somewhere along the path.

FIG. 1 illustrates a network including switching hubs (switch) 1 to 8. The switching hubs 1 to 5 each store a correspondence relationship of a MAC (Media Access Control) address and port identification information of a port via which a frame destined for the MAC address is transferred, as illustrated in tables 1a to 5a.

The switching hub 1 sends a link trace frame to a multicast address with a link trace target set to the switching hub 5. The switching hub 2 receives the link trace frame. The switching hub 2 refers to the table 2a. The switching hub 2 transfers the link trace frame to the switching hub 3 via a port with port identification information of "P2" corresponding to a MAC address of "5" of the switching hub 5, which is the link trace target. The switching hub 2 sends back a response frame to the switching hub 1 via a port with port identification information of "P1" corresponding to a MAC address of "1" of the switching hub 1 simultaneously with the transfer. While the response frame is described as being sent simultaneously with the transfer, the present invention is not limited thereto and may include a response frame sent substantially within a predetermined time of transferring the link trace frame.

The switching hub 3 similarly receives the link trace frame. The switching hub 3 refers to the table 3a and transfers the link trace frame via a port with port identification information of "P2" corresponding to the MAC address of "5." The switching hub 3 sends back a response frame via a port with port identification information of "P1" corresponding to the MAC address of "1", simultaneously with the transfer.

The switching hubs 4 and 5 each perform similar processing. Consequently, the switching hub 1 determines or confirms that a path to the switching hub 5 is normal.

Figure 2A:
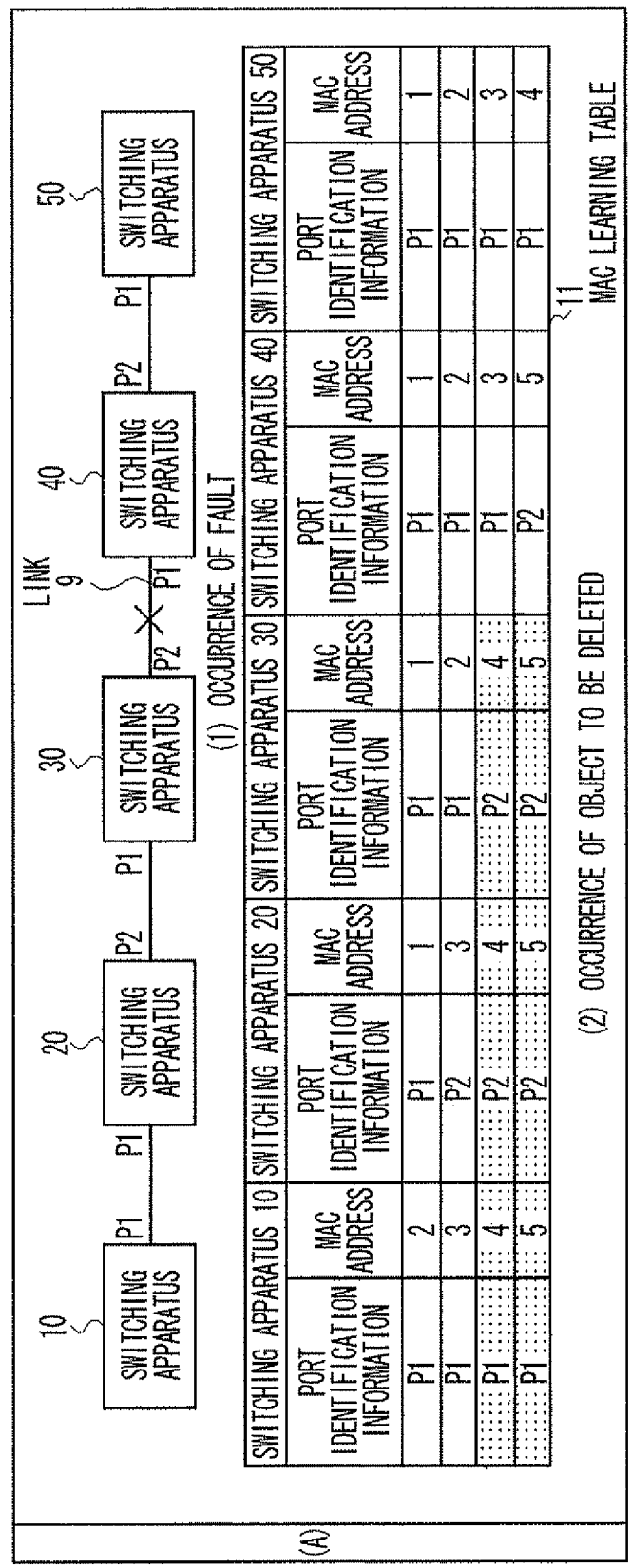
FIGS. 2(A) to 2(C) are charts illustrating an outline and features of a switching hub according to a first embodiment.
Figure 2B:
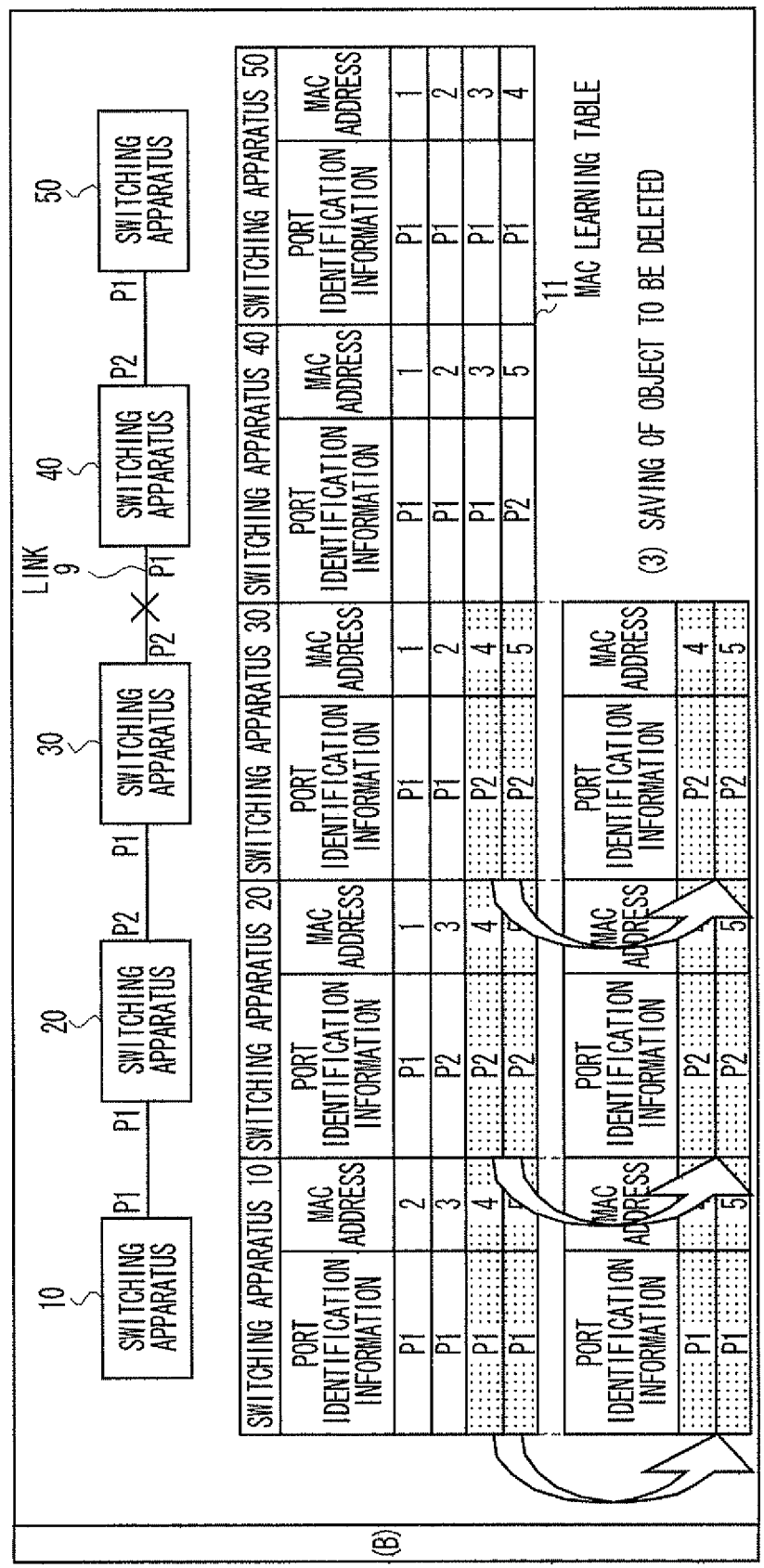
Figure 2C:
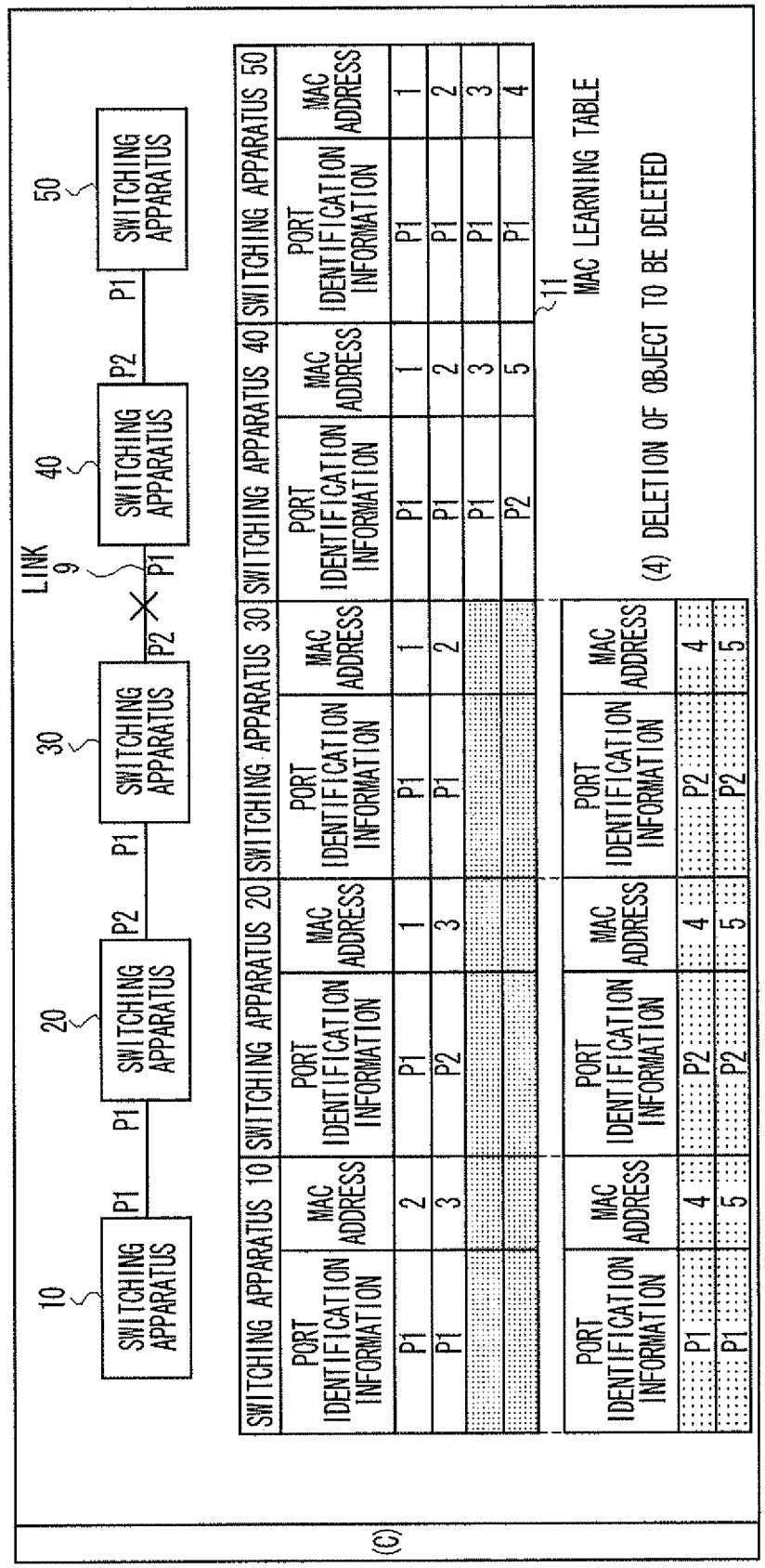

Embodiments of a switching hub will be described in detail below with reference to the drawings Outline and Features of Switching Hub An outline and features of a switching hub will first be described with reference to FIGS. 2(A) to 2(C). FIGS. 2(A) to 2(C) are charts for illustrating an outline and features of a switching hub.

As illustrated in FIGS. 2(A) to 2(C), each adjacent two switching hubs (apparatuses) 10 to 50 are connected with each other by a dedicated cable, thereby forming an Ethernet (registered trademark) network. The switching hubs 10 to 50 each have a MAC learning table. Each MAC learning table stores information indicating a correspondence relationship of a MAC address and port identification information uniquely identifying a port for transferring a frame to which the MAC address is assigned. The switching hubs 10 to 50 receive a link trace frame and corresponding MAC learning tables thereof are kept updated. Upon receipt of the link trace frame, each of the switching hubs 10 to 50 read out a MAC address from a corresponding MAC learning table. The switching hub 10 to 50 transfer the link trace frame via a port determined by a correspondence relationship in the MAC learning table. The switching hub 10 to 50 send back (or return) a response frame to a switching hub which is an originator of the link trace frame simultaneously with the transfer. As such, the switching hub allows location of a fault in a network.

The disclosed switching hub saves a correspondence relationship set as an object to be deleted in a predetermined storage unit at a time of updating a corresponding MAC learning table.

An explanation will be given with concrete descriptions with reference to FIG. 2(A). If a fault occurs related to a link 9, as indicated by (1) in FIG. 2(A), the switching hubs 10 to 30 stop receiving a link trace frame from the switching hubs 40 and 50, as indicated by (2) in FIG. 2(A). For this reason, the switching hubs 10 to 30 may be set, as objects to be deleted, as indicated by shaded correspondence relationships relevant to a MAC address of "4" of the switching hub 40 and a MAC address of "5," of the switching hub 50 in MAC learning tables 11 of the switching hubs 10 to 30.

Each of the switching hubs 10 to 30 save the correspondence relationships set as the objects to be deleted in a predetermined storage unit, as indicated by (3) in FIG. 2(B). After that, the switching hub deletes the objects to be deleted, as indicated by (4) in FIG. 2(C).

If there is no correspondence relationship relevant to a MAC address assigned to a received link trace frame in the MAC learning table, the switching hub transfers the link trace frame via a port determined by a correspondence relationship saved in the storage unit. The switching hub sends back a response frame to a switching hub which is the originator of the link trace frame simultaneously with the transfer.

More specifically, the switching hub 10 sends a link trace frame to a multicast address with a link trace target set to the switching hub 50. The switching hub 20 receives the link trace frame. The switching hub 20 searches for port identification information corresponding to the MAC address of "5" assigned to the switching hub 50 in a corresponding MAC learning table 11. The switching hub 20 searches the MAC learning table 11. If no corresponding port identification information is found, the switching hub 20 searches for the port identification information corresponding to the MAC address of "5" among correspondence relationships stored in a corresponding storage unit. The switching hub 20 finds port identification information of "P2" corresponding to the MAC address of "5." The switching hub 20 then transfers the link trace frame via a port with the port identification information of "P2." The switching hub 20 sends back a response frame to the switching hub 10 simultaneously with the transfer.

The switching hub 30 receives the link trace frame transferred from the switching hub 20. The switching hub 30 also searches for port identification information corresponding to the assigned MAC address of "5" in a corresponding MAC learning table 11. The switching hub 30 searches the MAC learning table 11. If no corresponding port identification information is found, the switching hub 30 searches for the port identification information corresponding to the MAC address of "5" among correspondence relationships stored in a corresponding storage unit. The switching hub 30 finds port identification information of "P2" corresponding to the MAC address of "5." The switching hub 30 then transfers the link trace frame via a port with the port identification information of "P2." The switching hub 30 sends back a response frame to the switching hub 10 simultaneously with the transfer.

The switching hub 40 does not receive the link trace frame transferred from the switching hub 30 because the fault is present in the link 9. In other words, the switching hub 10 does not receive a response frame from the switching hub 40. Since the switching hub 10 receives response frames from the switching hubs 20 and 30 as the result of sending the link trace frame with the link trace target set to the switching hub 50, a location of the fault (finds out that the fault is present downstream of the switching hub 30) is determined.

Accordingly, the disclosed switching hub allows location of a fault in a network, as already described using the above-identified main features. In other words, response frames sent from switching hubs irrelevant or unrelated to a fault in a network allow location of the fault in the network.

Configuration of Switching Hub

Figure 3:
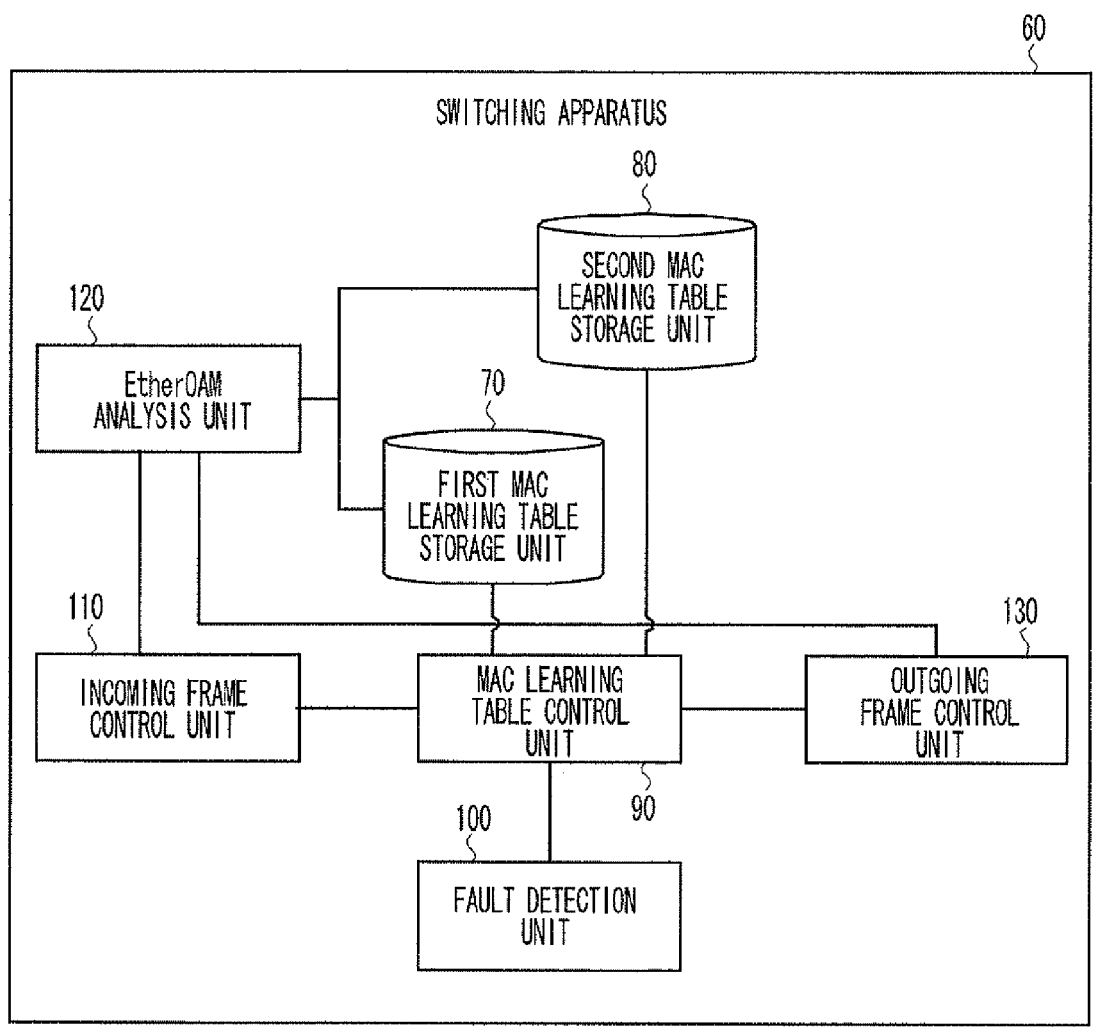
FIG. 3 is a block diagram illustrating a configuration of a switching hub.

A configuration of the switching hubs 10 to 50 illustrated in FIGS. 2(A) to 2(C) will be described next with reference to FIG. 3. FIG. 3 is a block diagram illustrating the configuration of a switching hub (apparatus).

As shown in FIG. 3, a switching hub (apparatus) 60 includes a first MAC learning table storage unit 70, a second MAC learning table storage unit 80, a MAC learning table control unit 90, a fault detection unit 100, an incoming frame control unit 110, an EtherOAM analysis unit 120, and an outgoing frame control unit 130. The second MAC learning table storage unit 80 is also referred to as a "predetermined storage unit". The MAC learning table control unit 90 is also be referred as a "saving procedure" and the EtherOAM analysis unit 120 is also be referred to as a "transfer procedure".

The first MAC learning table storage unit 70 stores a first MAC learning table in which information of a correspondence relationship of a MAC address and port identification information uniquely identifying a port for transferring a frame to which the MAC address is assigned is registered. For example, the first MAC learning table storage unit 70 stores a MAC learning table in which a correspondence relationship of port identification information of "P1" and a MAC address of "1" and the like are registered, as shown in FIG. 4.

The second MAC learning table storage unit 80 stores a second MAC learning table for saving information of a correspondence relationship of a MAC address and port identification information which is set as an object to be deleted at a time of updating the first MAC learning table. For example, the second MAC learning table storage unit 80 stores a MAC learning table in which a correspondence relationship of port identification information of "P2" and a MAC address of "4" set as an object to be deleted, etc. are registered, as shown in FIG. 5.

The MAC learning table control unit 90 registers or deletes a correspondence relationship of a MAC address and port identification information in the first MAC learning table upon receipt of a frame or deletes a correspondence relationship from the first MAC learning table. The MAC learning table control unit 90 saves a correspondence relationship set as an object to be deleted in the second MAC learning table at the time of updating the first MAC learning table.

More specifically, if a MAC address and port identification information stored in the first MAC learning table remain unupdated (has not be updated) over a predetermined period, the MAC learning table control unit 90 sets a correspondence relationship corresponding to the MAC address and port identification information as an object to be deleted. If the MAC learning table control unit 90 receives port identification information from the fault detection unit 100 (described below), it sets a correspondence relationship corresponding to the port identification information as an object to be deleted. The MAC learning table control unit 90 saves the correspondence relationship set as the object to be deleted in the second MAC learning table. After that, the MAC learning table control unit 90 deletes the correspondence relationship from the first MAC learning table.

For example, if a correspondence relationship of the MAC address of "5" and port identification information of "P2" remains unupdated for 5 minutes, the MAC learning table control unit 90 saves the correspondence relationship in the second MAC learning table. After that, the MAC learning table control unit 90 deletes the correspondence relationship from the first MAC learning table. As another example, if the MAC learning table control unit 90 receives port identification information of "P2" from the fault detection unit 100, it saves a correspondence relationship corresponding to the port identification information of "P2" in the second MAC learning table. After that, the MAC learning table control unit 90 deletes the correspondence relationship from the first MAC learning table.

Note that upon receipt of a frame from an incoming frame control unit 110 (described below), the MAC learning table control unit 90 registers a correspondence relationship of a source MAC address of the frame and port identification information of a port via which the frame is received in the first MAC learning table or updates the correspondence relationship. After the MAC learning table control unit 90 finds port identification information corresponding to a destination MAC address in the first MAC learning table, it outputs the frame to the outgoing frame control unit 130 (described below). The MAC learning table control unit 90 also makes a notification of the port identification information.

The fault detection unit 100 detects fault(s) caused by various factors. More specifically, if a hardware fault occurs in a port or if a physical fault occurs in a link, the fault detection unit 100 detects the fault. The fault detection unit 100 then outputs port identification information of a port relevant to the fault to the MAC learning table control unit 90. For example, if a hardware fault occurs in a given port with port identification information of "P1," the fault detection unit 100 detects the fault and outputs the port identification information of "P1" to the MAC learning table control unit 90. As another example, if a physical fault occurs in a link leading to a given port with port identification information of "P2," the fault detection unit 100 detects the fault and outputs the port identification information of "P2" to the MAC learning table control unit 90.

The incoming frame control unit 110 classifies a received frame and outputs the received frame to the MAC learning table control unit 90 or the EtherOAM analysis unit 120 (described below). More specifically, if the received frame is a link trace frame, the incoming frame control unit 110 outputs the received frame to the EtherOAM analysis unit 120. The incoming frame control unit 110 outputs incoming frames other than link trace frames to the MAC learning table control unit 90.

If there is no correspondence relationship relevant to a MAC address assigned to a received link trace frame in the first MAC learning table, the EtherOAM analysis unit 120 transfers the link trace frame via a port determined by a correspondence relationship saved in the second MAC learning table. The EtherOAM analysis unit 120 sends back a response frame to a switching hub which is the originator of the link trace frame simultaneously with the transfer.

More specifically, if the EtherOAM analysis unit 120 receives a link trace frame from the incoming frame control unit 110, it searches the first MAC learning table using a MAC address of a link trace target. If the EtherOAM analysis unit 120 finds a correspondence relationship corresponding to the MAC address among ones stored in the first MAC learning table, it transfers the link trace frame via a port determined by port identification information of the correspondence relationship. The EtherOAM analysis unit 120 instructs the outgoing frame control unit 130 (described below) to send back a response frame to the link trace frame simultaneously with the transfer.

On the other hand, if no correspondence relationship corresponding to the MAC address is found as the result of searching the first MAC learning table using the MAC address of the link trace target, the EtherOAM analysis unit 120 searches the second MAC learning table. If the EtherOAM analysis unit 120 finds a correspondence relationship corresponding to the MAC address among ones stored in the second MAC learning table, it transfers the link trace frame via a port determined by port identification information of the correspondence relationship. The EtherOAM analysis unit 120 instructs the outgoing frame control unit 130 (described below) to send back a response frame to the link trace frame simultaneously with the transfer. Note that when the EtherOAM analysis unit 120 instructs the outgoing frame control unit 130 to send back a response frame, it notifies the outgoing frame control unit 130 of port identification information corresponding to a source MAC address of the link trace frame.

Figure 11:
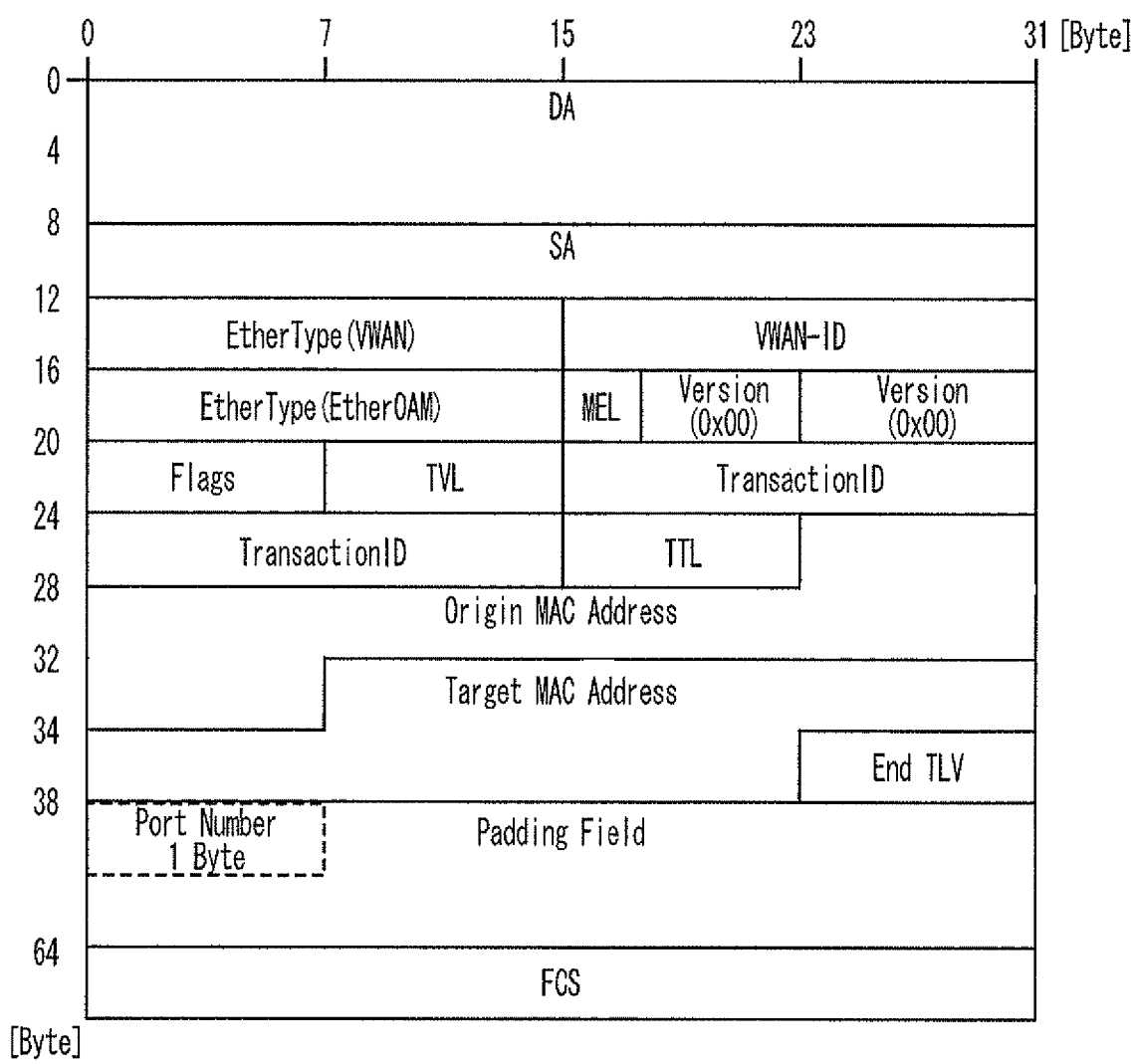
FIG. 11 is a diagram illustrating a frame format of a response frame.

The outgoing frame control unit 130 sends back a response frame to a link trace frame or a frame. More specifically, if the outgoing frame control unit 130 is instructed by the EtherOAM analysis unit 120 to send back a response frame to a link trace frame, it sends back the response frame via a port determined by port identification information of which it is notified. If the outgoing frame control unit 130 receives a frame from the MAC learning table control unit 90, it sends the frame via a port determined by port identification information of which it is notified. The outgoing frame control unit 130 sends back a response frame with a frame format as illustrated in FIG. 11. Note that FIG. 11 is a diagram illustrating an example of the frame format of a response frame.

Processing by Switching Hub

Figure 6:
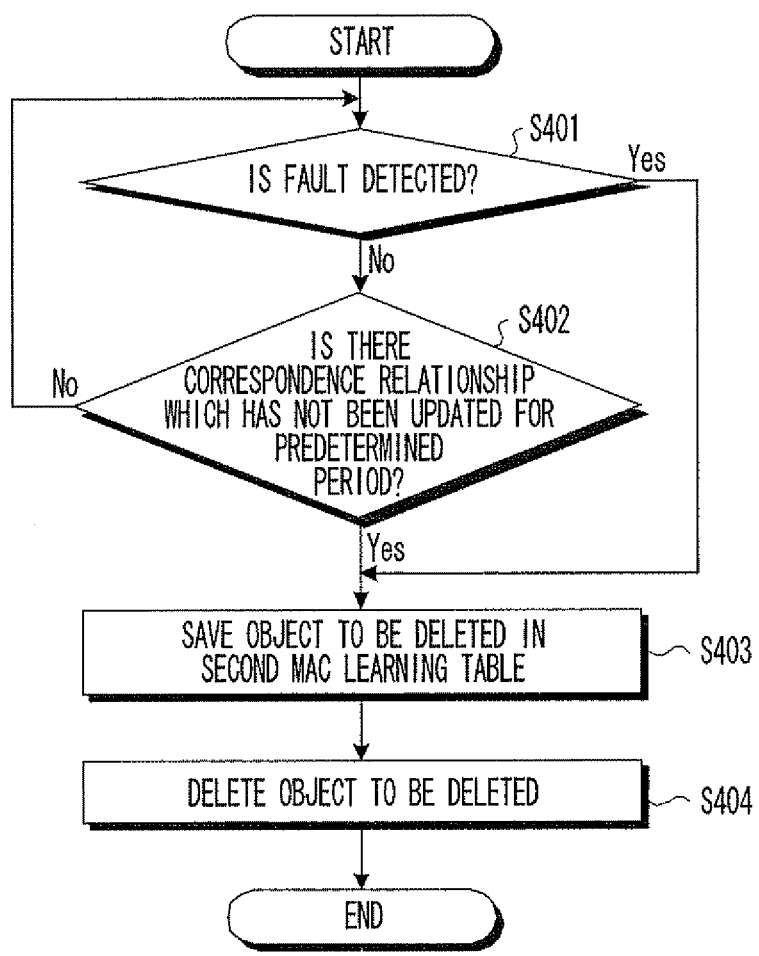
FIG. 6 is a flow chart illustrating a flow of a MAC learning table control process.
Figure 7:
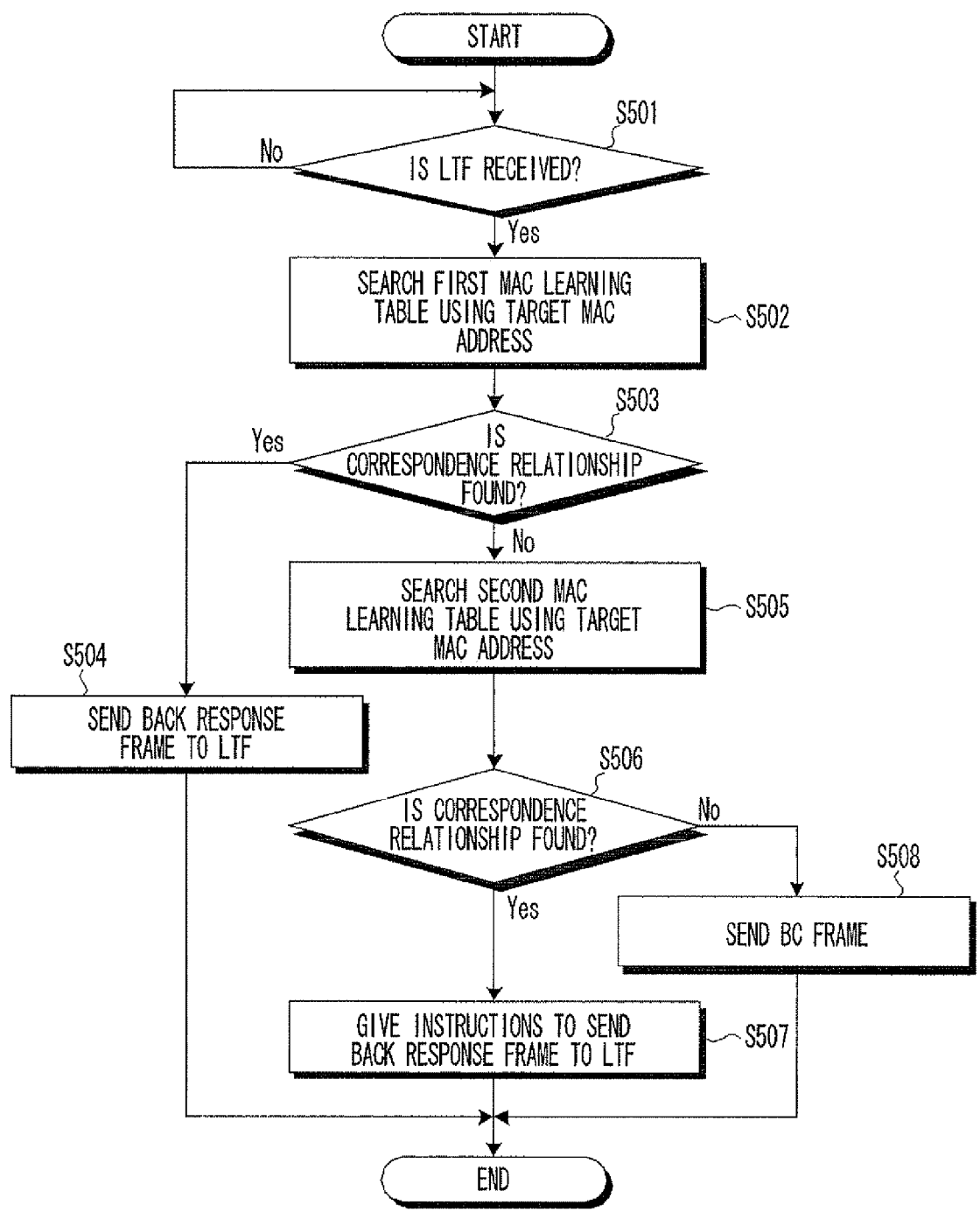
FIG. 7 is a flow chart illustrating a flow of a response frame send-back process.

Processing by the switching hub (apparatus) will be described with reference to FIGS. 6 and 7. FIG. 6 is a flow chart illustrating a flow of a MAC learning table control process, and FIG. 7 is a flow chart illustrating a flow of a response frame send-back process.

As shown in FIG. 6, in operation S401, the switching hub (apparatus) 60 performs monitoring, for example, via the fault detection unit 100 (FIG. 3) to check for fault(s). In operation S402, the switching hub 60 performs monitoring by the MAC learning table control unit 90 to check whether there is a correspondence relationship of a MAC address and port identification information which has not been updated over a predetermined period. Note that the order of the determination process in "operation S401" and that in "operation S402" in the flow chart shown in FIG. 6 may be reversed.

If YES in operation S401, i.e., the switching hub 60 detects a fault via the fault detection unit 100, the switching hub 60 saves a correspondence relationship set as an object to be deleted by the MAC learning table control unit 90 in the second MAC learning table in operation S403. After that, in operation S404, the switching hub 60 deletes the correspondence relationship from the first MAC learning table.

If YES in operation S402, i.e., the switching hub 60 finds a correspondence relationship which has not been updated over the predetermined period by the MAC learning table control unit 90, the switching hub 60 saves the correspondence relationship set as an object to be deleted by the MAC learning table control unit 90 in the second MAC learning table in operation S403. After that, in operation S404, the switching hub 60 deletes the correspondence relationship from the first MAC learning table. The switching hub 60 ends the process.

As shown in FIG. 7, if YES in operation S501, i.e., the EtherOAM analysis unit 120 receives a link trace frame (LTF) from the incoming frame control unit 110 (FIG. 3), it searches the first MAC learning table using a MAC address of a link trace target in operation S502.

If YES in operation S503, i.e., the EtherOAM analysis unit 120 finds a correspondence relationship corresponding to the MAC address among ones stored in the first MAC learning table, it transfers the link trace frame via a port determined by port identification information of the correspondence relationship in operation S504. The EtherOAM analysis unit 120 instructs the outgoing frame control unit 130 to send back a response frame to the link trace frame simultaneously with the transfer.

On the other hand, if NO in operation S503, i.e., no correspondence relationship corresponding to the MAC address is found among the ones stored in the first MAC learning table, the EtherOAM analysis unit 120 searches the second MAC learning table in operation S505.

If YES in operation S506, i.e., the EtherOAM analysis unit 120 finds a correspondence relationship corresponding to the MAC address among ones stored in the second MAC learning table, it transfers the link trace frame via a port determined by port identification information of the correspondence relationship in operation S507. The EtherOAM analysis unit 120 instructs the outgoing frame control unit 130 to send back a response frame to the link trace frame simultaneously with the transfer. Note that if NO in operation S506, i.e., no correspondence relationship corresponding to the MAC address is found among the ones stored in the second MAC learning table, the EtherOAM analysis unit 120 instructs the outgoing frame control unit 130 to send a broadcast (BC) frame in operation S508. The EtherOAM analysis unit 120 ends the process.

A case has been described in an embodiment where each pair of switching hubs is linked. A case will be described in an embodiment where a predetermined pair of switching hubs is configured to provide one-to-one protection.

Figure 8A:
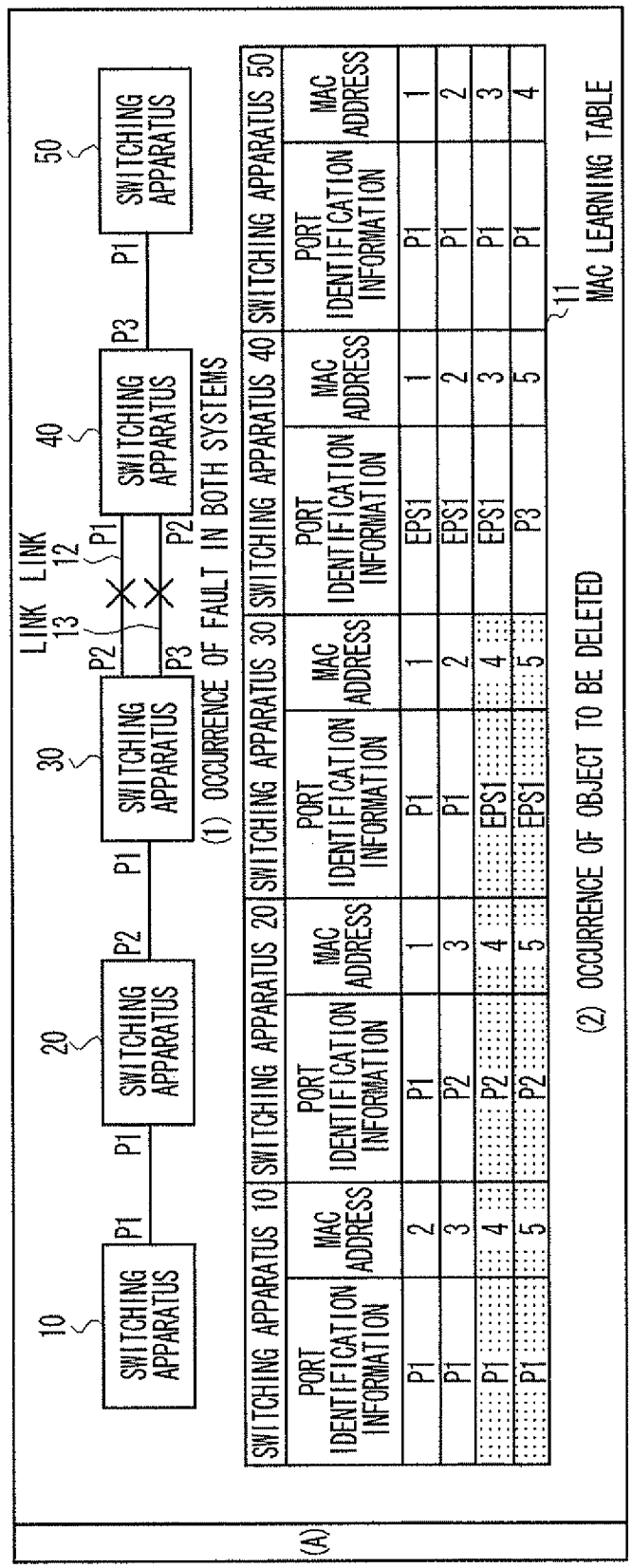
FIGS. 8(A) to 8(C) are charts illustrating a switching hub.
Figure 8B:
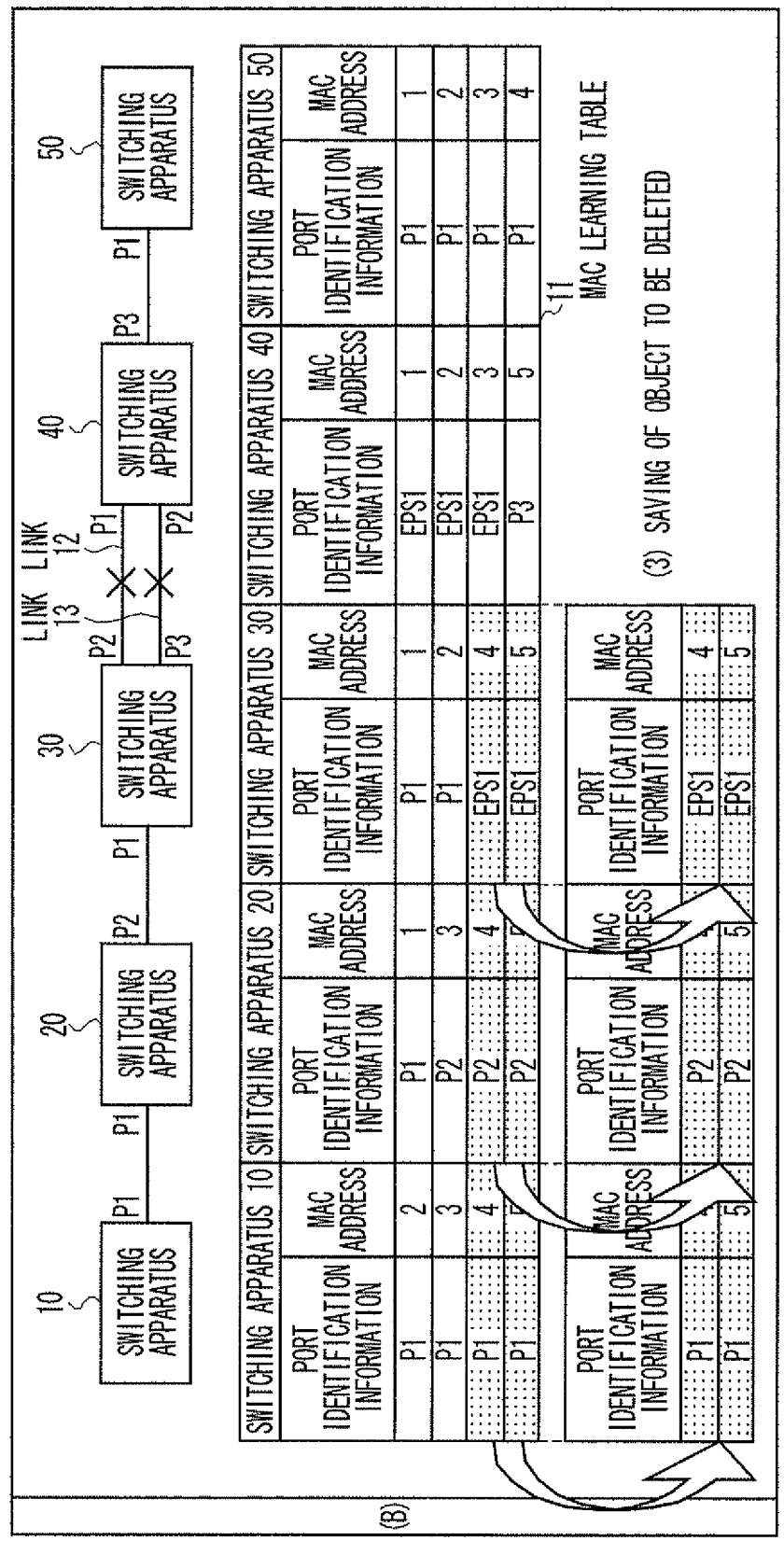
Figure 8C:
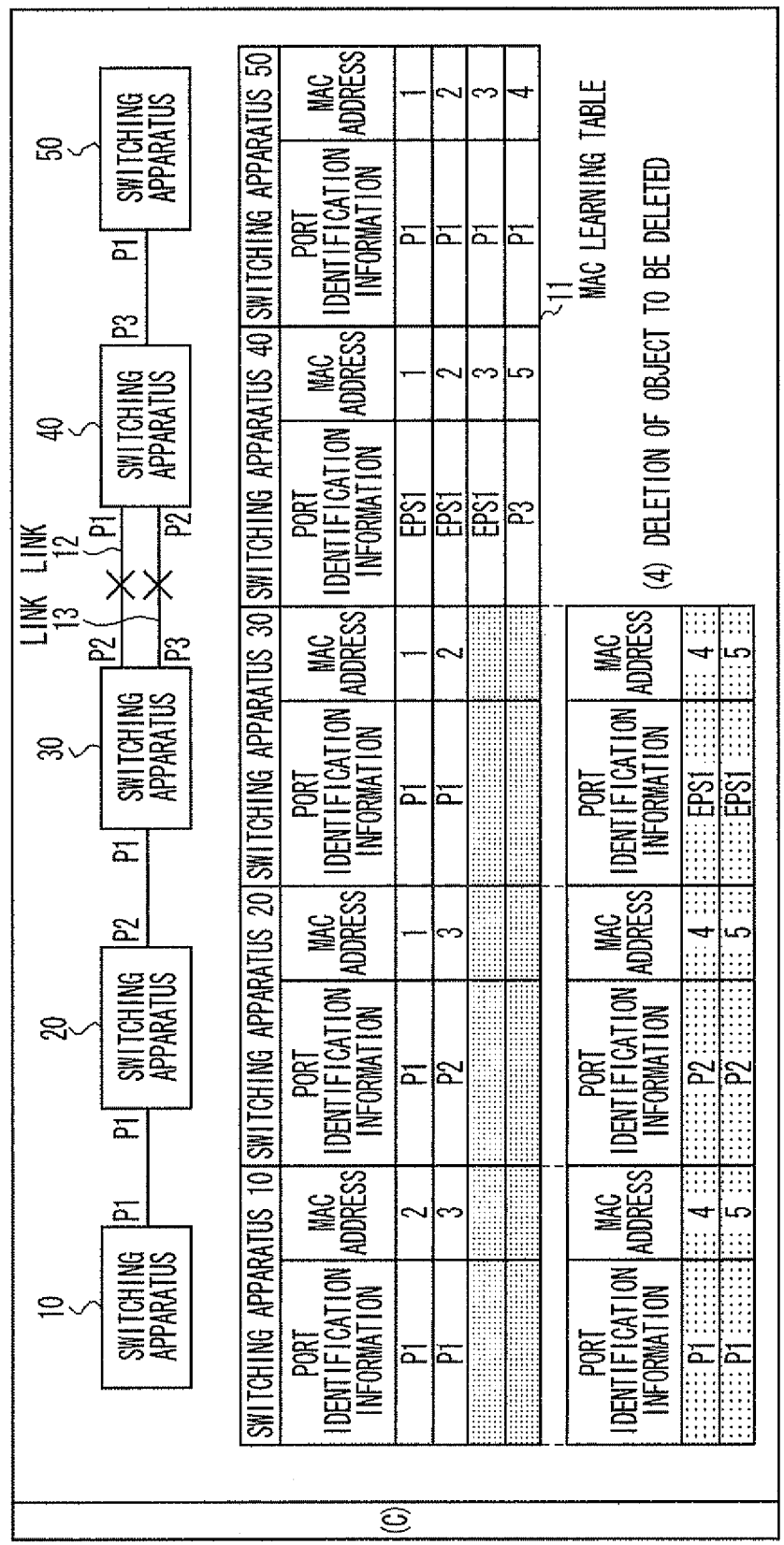

A switching hub according to an embodiment will be described with reference to FIGS. 8(A) to 8(C). FIGS. 8(A) to 8(C) are charts for illustrating switching hub.

As shown in FIG. 8(A), a one-to-one protection is provided between a switching hub 30 and a switching hub 40. If a fault occurs in both systems of a link 12 and a link 13, as indicated by (1) in FIG. 8(A), switching hubs 10 and 20 and the switching hub 30 stop receiving a frame from the switching hub 40 and a switching hub 50. Shaded correspondence relationships relevant to a MAC address of "4" of the switching hub 40 and a MAC address of "5" of the switching hub 50 in MAC learning tables 11 of the switching hubs 10 to 30 are set as objects to be deleted, as indicated by (2) in FIG. 8(A).

Each of the switching hubs 10 to 30 saves the correspondence relationships set as the objects to be deleted in a predetermined storage unit, as indicated by (3) in FIG. 8(B). After that, the switching hub deletes the objects to be deleted, as indicated by (4) in FIG. 8(C).

A case will be described in an embodiment where a fault is repaired, and a saved correspondence relationship including a MAC address is relearned and stored again in a first MAC learning table.

Figure 9A:
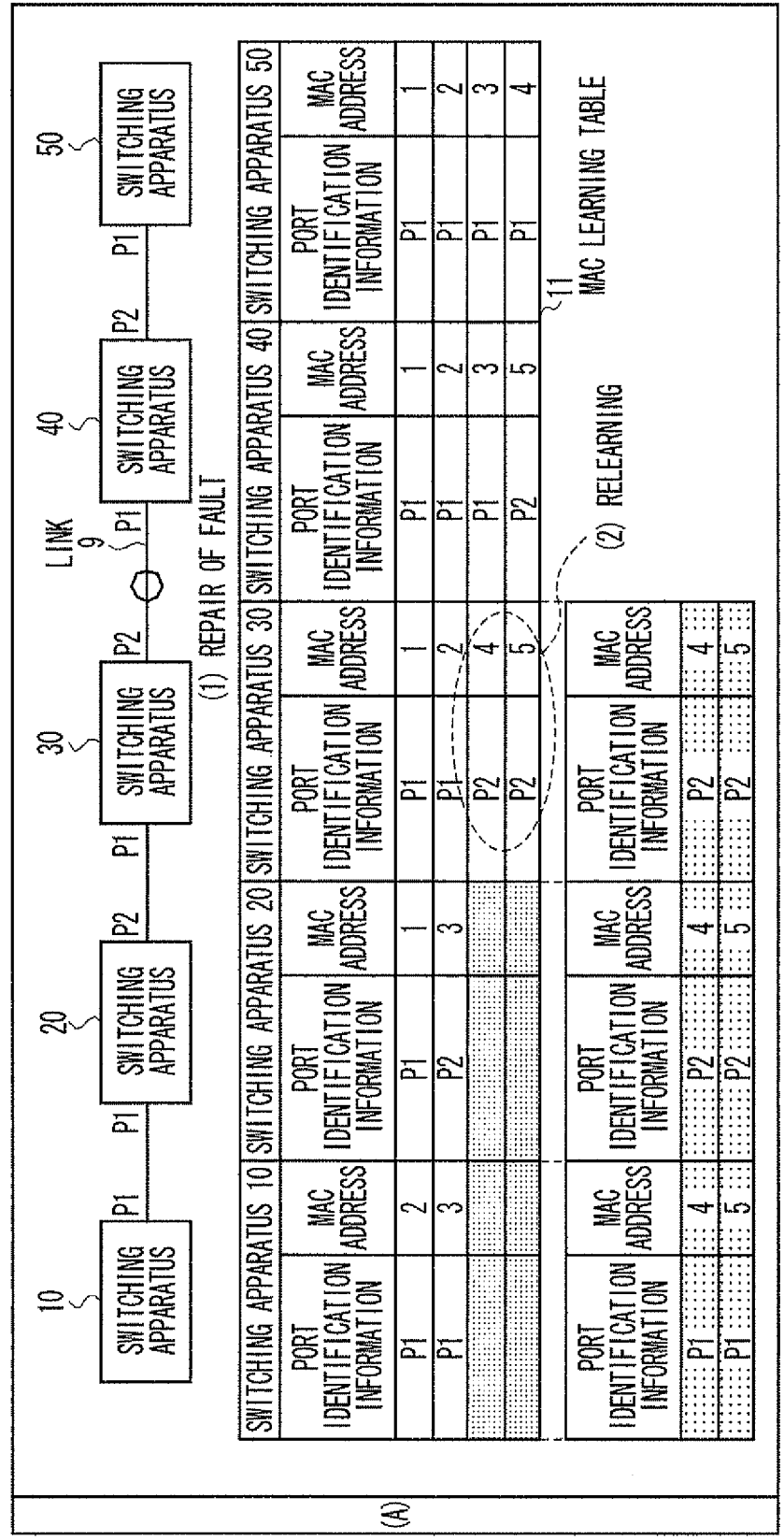
FIGS. 9(A) and 9(B) are charts illustrating a switching hub.
Figure 9B:
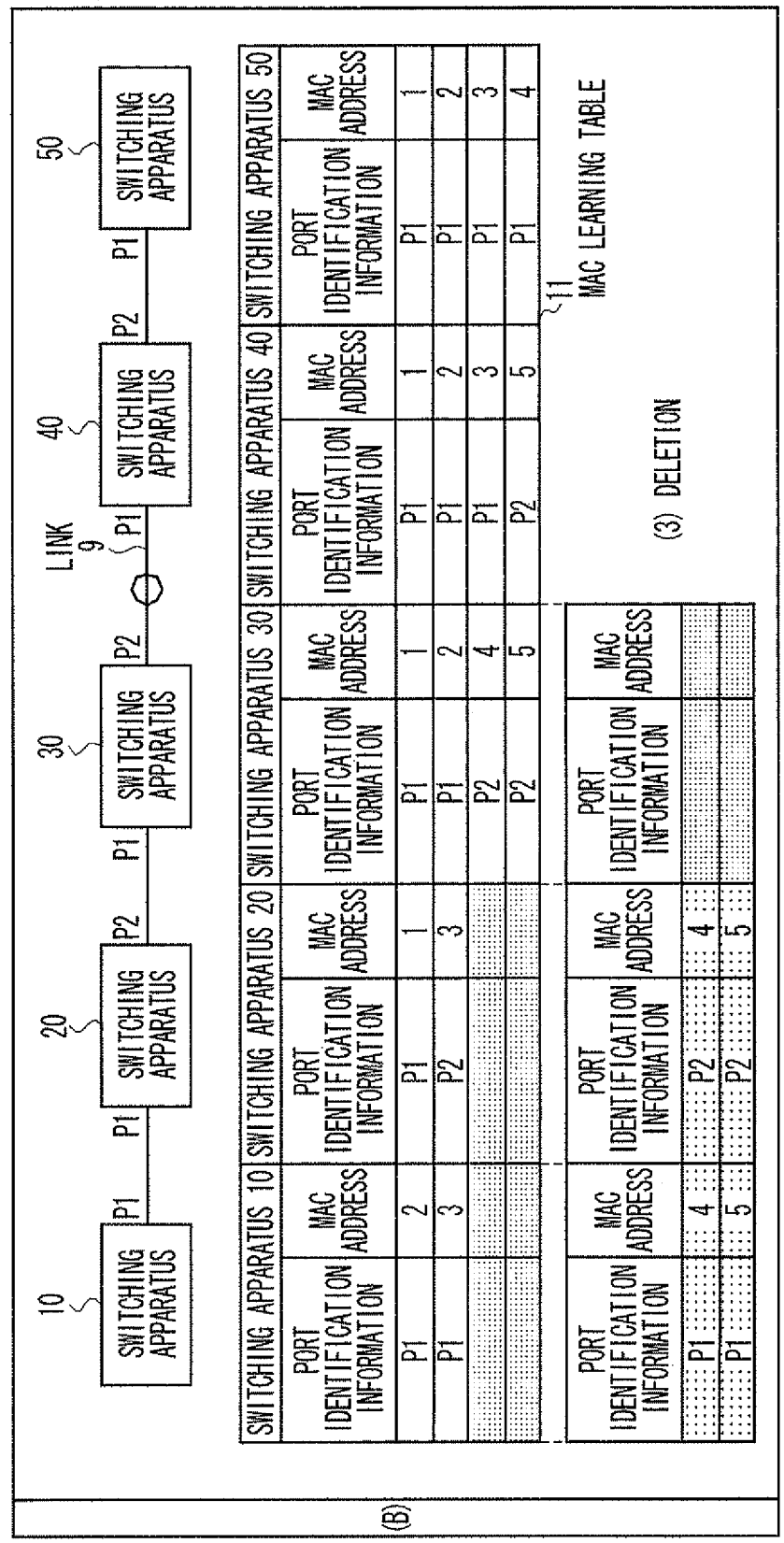

A switching hub according to the embodiment will be described with reference to FIGS. 9(A) and 9(B). FIGS. 9(A) and 9(B) are charts for illustrating the switching hub.

If a fault present in a link 9 is repaired, and a switching hub 30 starts receiving a frame from switching hubs 40 and 50, as indicated by (1) in FIG. 9(A), the switching hub 30 relearns correspondence relationships relevant to a MAC address of "4" of the switching hub 40 and a MAC address of "5" of the switching hub 50, as indicated by (2) in FIG. 9(A).

The switching hub 30 deletes the correspondence relationships relevant to the MAC address of "4" of the switching hub 40 and the MAC address of "5" of the switching hub 50 from a second MAC learning table, as indicated by (3) in FIG. 9(B).

More specifically, if the fault in the link 9 is repaired, and a frame is received from the switching hub 40 or 50, an incoming frame control unit 110 outputs the frame to a MAC learning table control unit 90. The incoming frame control unit 110 also notifies the MAC learning table control unit 90 of port identification information of a port via which the frame is received. The MAC learning table control unit 90 registers a correspondence relationship of a source MAC address of the frame and the port identification information of the receiving port in a first MAC learning table. In other words, the MAC learning table control unit 90 performs relearning. After that, the MAC learning table control unit 90 deletes the correspondence relationships relevant to the source MAC address from the second MAC learning table. Note that although not shown, the same applies to other switching hubs. More specifically, if another switching hub receives a frame from the switching hub 40 or 50, it registers a correspondence relationship of a source MAC address of the frame and port identification information of a port via which the frame is received. In other words, the switching hub performs relearning.

A case will be described in an embodiment where an alternative path is set in the presence of a fault, and a saved correspondence relationship including a MAC address is relearned and stored again in a first MAC learning table.

Figure 10A:
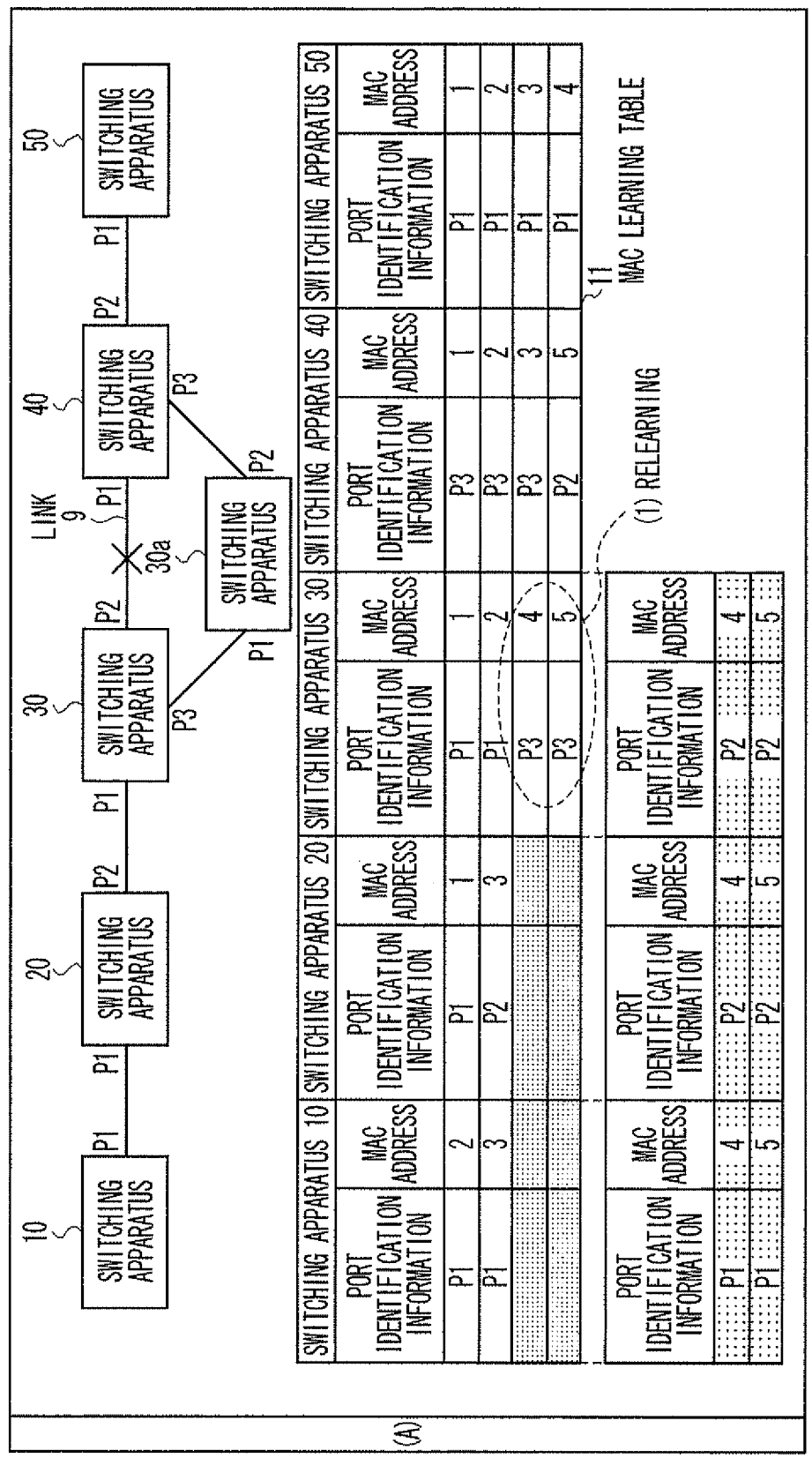
FIGS. 10(A) and 10(B) are charts illustrating a switching hub.
Figure 10B:
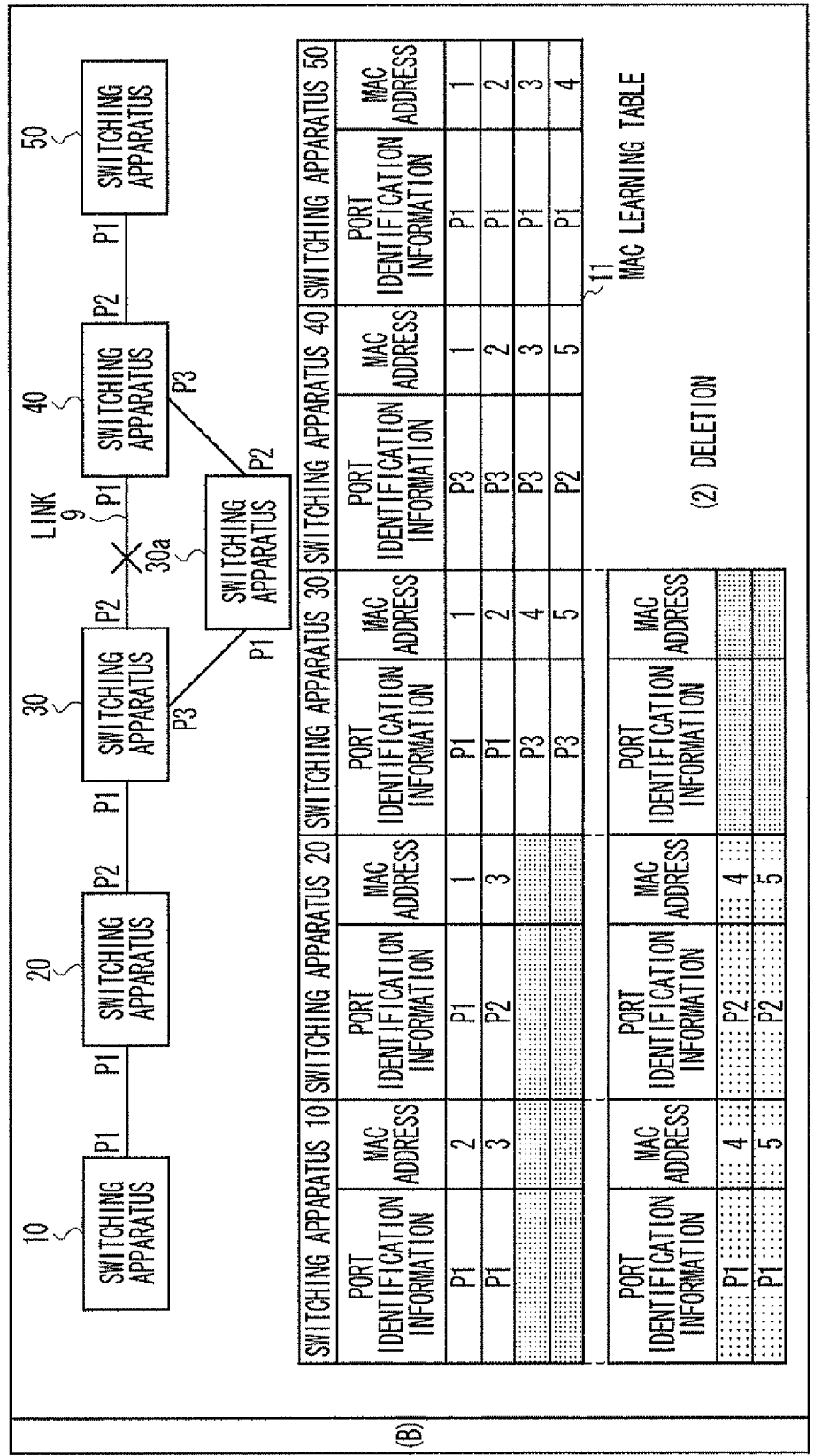

A switching hub according to the embodiment will be described with reference to FIGS. 10(A) and 10(B). FIGS. 10(A) and 10(B) are charts for illustrating the switching hub.

An alternative path is set for a switching hub 30 using a switching hub 30 in the presence of a fault in a link 9, as shown in FIG. 10(A). When the switching hub 30 starts receiving a frame from switching hubs 40 and 50, it relearns correspondence relationships relevant to a MAC address of "4" of the switching hub 40 and a MAC address of "5" of the switching hub 50, as indicated by (1) in FIG. 10(A).

The switching hub 30 deletes the correspondence relationships relevant to the MAC address of "4" of the switching hub 40 and the MAC address of "5" of the switching hub 50 from a second MAC learning table, as indicated by (2) in FIG. 10(B).

More specifically, if the switching hub 30 receives a frame from the switching hub 30a, an incoming frame control unit 110 outputs the frame to a MAC learning table control unit 90. The incoming frame control unit 110 also notifies the MAC learning table control unit 90 of port identification information of a port via which the frame is received. The MAC learning table control unit 90 registers a correspondence relationship of a MAC address of the switching hub 40 or 50, which is the originator of the frame and the port identification information of the receiving port in a first MAC learning table. In other words, the MAC learning table control unit 90 performs relearning. After that, the MAC learning table control unit 90 deletes the correspondence relationships relevant to the source MAC address from the second MAC learning table. Note that although not shown, the same applies to other switching hubs. More specifically, if another switching hub receives a frame from the switching hub 40 or 50, it registers a correspondence relationship of a source MAC address of the frame and port identification information of a port via which the frame is received.

Although particular embodiments have been described above, the disclosed apparatus and method may be embodied in various forms other than these embodiments. Set forth are other exemplary embodiments classified under headings (1) to (5) for ease of description.

(1) Identification of Faulty Port

A case has been described in the above described embodiment where a fault in a network is located on the basis of send-back of a response frame from a switching hub which is not affected by the fault in the network. However, the disclosed apparatus and method are not limited to this. For example, a faulty port may be identified by appending port identification information to a response frame.

More specifically, an EtherOAM analysis unit 120 (FIG. 3) finds a correspondence relationship relevant to a MAC address of a link trace target in a second MAC learning table, and transfers a link trace frame via a port determined by port identification information of the correspondence relationship. At the same time, the EtherOAM analysis unit 120 outputs the port identification information to an outgoing frame control unit 130 and instructs the outgoing frame control unit 130 to send back a response frame to the link trace frame. The outgoing frame control unit 130 appends the received port identification information to the response frame and sends back the response frame via a port determined by port identification information of which it is notified. This, for example, allows a switching hub which has received a response frame to identify a faulty port.

(2) Repair of Fault

A case has been described in an embodiment where after a correspondence relationship is relearned and stored again in a first MAC learning table, the correspondence relationship saved in the second MAC learning table is deleted. However, the disclosed apparatus and method is not limited to this. A correspondence relationship including a MAC address to be added may be deleted before or simultaneously with updating of a first MAC learning table. For example, if a fault detection unit 100 detects a repair pertaining to a fault in a link leading to a predetermined port, it outputs port identification information of the port to a MAC learning table control unit 90.

The MAC learning table control unit 90 deletes a correspondence relationship including the received port identification information from a second MAC learning table. With these series of operations, the correspondence relationship is relearned and stored again in the first MAC learning table upon receipt of a frame via the port, and a transition to a normal operating state can be made.

(3) System Configuration and Others

The components of each apparatus shown in FIG. 3 are functionally conceptual. Accordingly, the components need not be physically configured in the manner shown in FIG. 3. In other words, a specific form of distribution and integration is not limited to that shown in FIG. 3. For example, a MAC learning table control unit 90 can be configured as distributed components, a frame control unit which performs updating of a first MAC learning table or deletion of data from the first MAC learning table and instructs an outgoing frame control unit to send a frame and a saving unit which saves, in a second MAC learning table, a correspondence relationship set as an object to be deleted from the first MAC learning table. It is also possible to functionally or physically distribute and integrate all or part of the MAC learning table control unit 90 in arbitrary units according to various loads, states of use, and the like. Additionally, all or an arbitrary part of the processing functions performed by each apparatus can be realized by a CPU and a program analyzed and executed by the CPU or can be realized as hardware using wired logic.

Further, it is possible to arbitrarily change processing procedures, control procedures, specific names, and information including various data and parameters which are illustrated in the specification or drawings, unless otherwise specified. For example, although a numeric value such as "1" or "2" is used as a MAC address, a MAC address is not limited to this. Any value may be used as long as it uniquely identifies a switching hub or a piece of networking equipment.

(4) Link Trace Frame Transfer Program

Figure 12:
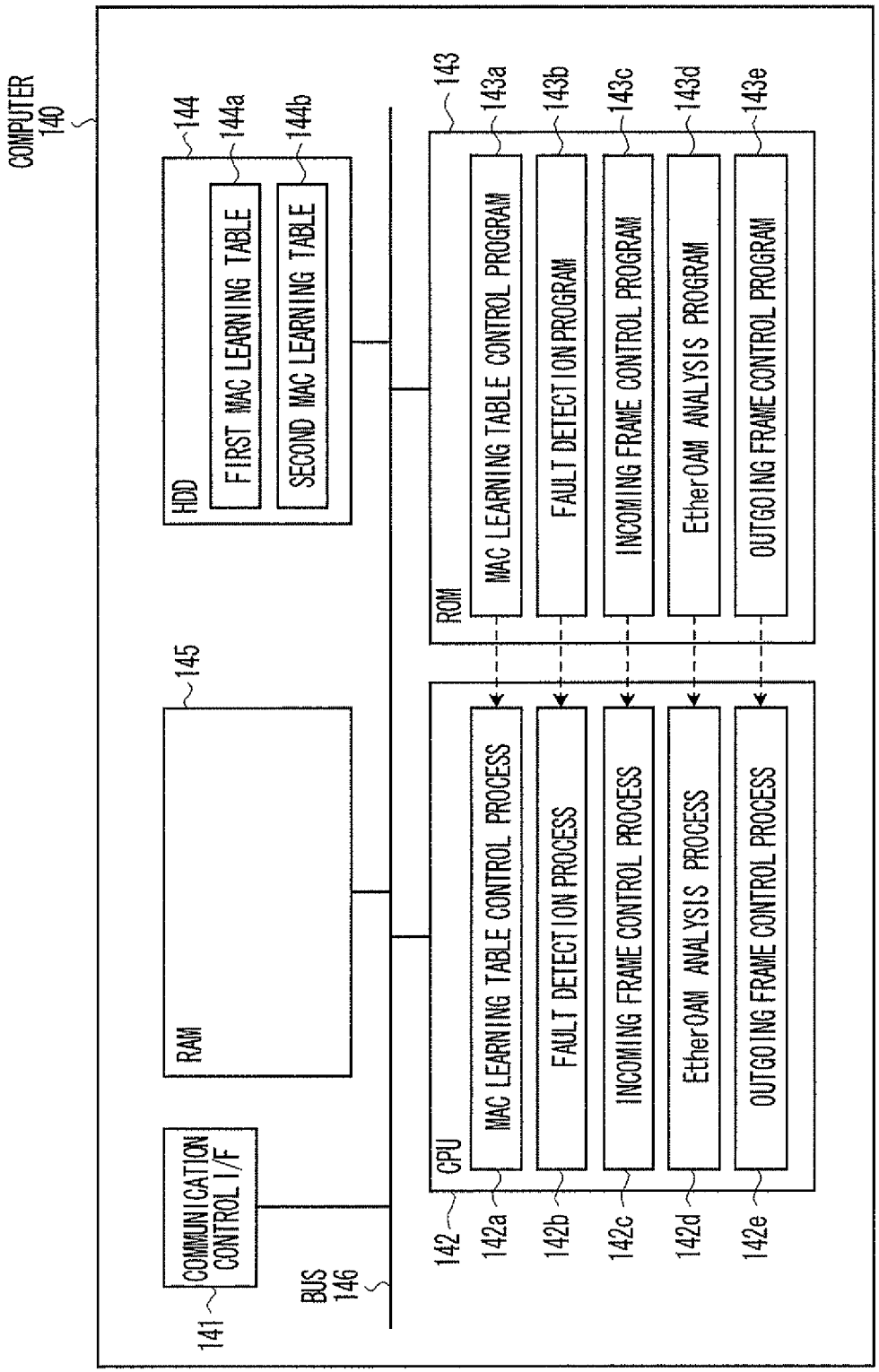
FIG. 12 is a diagram illustrating a computer which executes a link trace frame transfer program.

A case has been described in an embodiment where various processes are realized by hardware logic. However, the disclosed apparatus and method are not limited to this, and various processes may be realized by executing a program by a computer. An example of a computer which executes a link trace frame transfer program having the same functions as those of the switching hub 60 above described will be described below with reference to FIG. 12. FIG. 12 is a diagram illustrating a computer which executes a link trace frame transfer program.

As shown in FIG. 12, a computer 140 as a switching hub is including a communication control I/F 141, a CPU 142, a ROM 143, an HDD 144, and a RAM 145 which are connected by a bus 146 or the like. While FIG. 12 is described with reference to a computer, the present invention is not limited thereto and may include a specialized system or device, etc.

A link trace frame transfer program which fulfills the same functions as those of the switching hub 60 described in the embodiments, i.e., a MAC learning table control program 143a, a fault detection program 143b, an incoming frame control program 143c, an EtherOAM analysis program 143d, and an outgoing frame control program 143e are stored in advance in the ROM 143, as shown in FIG. 12. Note that the programs 143a to 143e may be appropriately integrated or distributed, like the components of the switching hub shown in FIG. 3.

The CPU 142 reads out and executes the programs 143a to 143e from the ROM 143, thereby allowing them to function as a MAC learning table control process 142a, a fault detection process 142b, an incoming frame control process 142c, an EtherOAM analysis process 142d, and an outgoing frame control process 142e, as shown in FIG. 12. Note that the processes 142a to 142e respectively correspond to the MAC learning table control unit 90, fault detection unit 100, incoming frame control unit 110, EtherOAM analysis unit 120, and outgoing frame control unit 130 shown in FIG. 3.

A first MAC learning table 144a and a second MAC learning table 144b are provided in the HDD 144, as shown in FIG. 12. The first MAC learning table 144a and second MAC learning table 144b respectively correspond to the first MAC learning table storage unit 70 and second MAC learning table storage unit 80 shown in FIG. 3. Note that the first MAC learning table 144a and second MAC learning table 144b may be provided in the RAM 145.

Note that the programs 143a to 143e need not be stored in advance in the ROM 143. For example, the programs may be stored in a "portable physical medium" such as a flexible disk (FD), a CD-ROM, a DVD disk, a magneto-optical disk, or an IC card that is inserted into the computer 140, a "fixed physical medium" such as an HDD provided inside or outside the computer 140, or "another computer (or server)" connected to the computer 140 via a public line, the Internet, a LAN, a WAN, or the like. The computer 140 may read out the programs from these media or computers and execute them.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A non-transitory computer readable recording medium storing a link trace frame transfer program to cause a computer to execute operations, comprising:
    updating a MAC learning table storing that stores a correspondence relationship of a MAC address and port identification information identifying a port for transferring a frame to which the MAC address is assigned;
    executing a first transfer that includes reading a MAC address of a link trace frame and transferring the link trace frame via a port determined by a correspondence relationship in the MAC learning table;
    saving an object to be deleted in a predetermined storage unit at a time of updating the MAC learning table, said object identifying the correspondence relationship stored;
    executing a second transfer that includes transferring the link trace frame via a port determined by a correspondence relationship saved in the storage unit upon determining that there is no correspondence relationship relevant to the MAC address assigned to the link trace frame in the MAC learning table; and
    returning a response frame to a switching hub which is an originator of the link trace frame simultaneously with execution of each of the first transfer and second transfer, where the correspondence relationship identified by the object is deleted and causes the MAC learning table to relearn the correspondence relationship upon receipt of the response frame.

2. The recording medium according to claim 1, wherein when a correspondence relationship is set as an object to be deleted from the MAC learning table due to a fault in systems for which a one-to-one protection is provided, the correspondence relationship set as the object to be deleted is saved.

3. The recording medium according to claim 1, comprising:
    deleting, among correspondence relationships saved, a correspondence relationship including a MAC address set as an object to be added from the storage unit at the time of updating the MAC learning table.

4. The recording medium according to claim 1, wherein the second transfer appends, to the response frame, port identification information of the port determined by the correspondence relationship saved in the storage unit and sends back the response frame.

5. A switching hub, comprising:
    a MAC learning table that stores a correspondence relationship of a MAC address and port identification information, the port identification information identifying a port for transferring a frame to which the MAC address is assigned;
    an updating unit that updates the MAC learning table;
    a readout unit that reads out a MAC address of a link trace frame;
    a first transfer unit that transfers the link trace frame via a port determined by a correspondence relationship in the MAC learning table;
    a storage unit that stores a correspondence relationship of a predetermined MAC address and port identification information;
    a saving unit that saves an object to be deleted in the storage unit at a time of updating the MAC learning table, said object identifying the correspondence relationship stored;
    a second transfer unit that transfers the link trace frame via a port determined by a correspondence relationship saved in the storage unit upon determining that there is no correspondence relationship relevant to the MAC address assigned to the received link trace frame in the MAC learning table; and
    a responding unit that returns a response frame to a switching hub which is an originator of the link trace frame simultaneously with each transfer of the link trace frame by the first transfer unit and second transfer unit, and where the correspondence relationship identified by the object is deleted and causes the MAC learning table to relearn the correspondence relationship upon receipt of the response frame.

6. The switching hub according to claim 5, wherein when a correspondence relationship is set as an object to be deleted from the MAC learning table due to a fault in systems for which a one-to-one protection is provided, the saving unit saves the correspondence relationship set as the object to be deleted.

7. The switching hub according to claim 5, further comprising
    a deletion unit deleting, among correspondence relationships saved by the saving unit, a correspondence relationship including a MAC address set as an object to be added from the storage unit at the time of updating the MAC learning table.

8. The switching hub according to claim 5, wherein
    the second transfer unit appends, to the response frame, port identification information of the port determined by the correspondence relationship saved in the storage unit and sends back the response frame.

9. A link trace frame transfer method, comprising:
    updating a MAC learning table that stores a correspondence relationship of a MAC address and port identification information identifying a port for transferring a frame to which the MAC address is assigned;
    executing a first transfer that includes reading a MAC address of a link trace frame and transferring the link trace frame via a port determined by a correspondence relationship in the MAC learning table;

saving an object to be deleted in a predetermined storage unit at a time of updating the MAC learning table, said object identifying the correspondence relationship stored;

executing a second transfer that includes transferring the link trace frame via a port determined by a correspondence relationship saved in the storage unit upon determining that there is no correspondence relationship relevant to the MAC address assigned to the received link trace frame in the MAC learning table; and returning, via ach respective port of the first transfer and the second transfer, a response frame to the switching hub which is an originator of the link trace frame simultaneously with transfer of the link trace frame at execution of each of the first transfer and second transfer, and where the correspondence relationship identified by the object is deleted and causes the MAC learning table to relearn the correspondence relationship upon receipt of the response frame.

10. The link trace frame transfer method according to claim 9, wherein where a correspondence relationship is set as an object to be deleted from the MAC learning table due to a fault in both systems for which a one-to-one protection is provided, the correspondence relationship set as the object to be deleted is saved.

11. The link trace frame transfer method according to claim 9, comprising
deleting, among correspondence relationships saved, a correspondence relationship including a MAC address set as an object to be added from the storage unit at the time of updating the MAC learning table.

12. The link trace frame transfer method according to claim 9, wherein
the second transfer appends, to the response frame, port identification information of the port determined by the correspondence relationship saved in the storage unit and sends back the response frame.

* * * * *

UNITED STATES PATENT AND TRADEMARK OFFICE
CERTIFICATE OF CORRECTION

PATENT NO. : 8,677,015 B2
APPLICATION NO. : 11/963390
DATED : March 18, 2014
INVENTOR(S) : Suzuyama et al.

Page 1 of 1

It is certified that error appears in the above-identified patent and that said Letters Patent is hereby corrected as shown below:

In the Claims

Column 13, Line 11, In Claim 9, delete "ach" and insert -- each --, therefor.
Column 14, Line 2, In Claim 10, delete "where" and insert -- when --, therefor.

Signed and Sealed this
First Day of July, 2014

Michelle K. Lee
*Deputy Director of the United States Patent and Trademark Office*